United States Patent
Rodrigues et al.

(10) Patent No.: US 9,361,695 B2
(45) Date of Patent: Jun. 7, 2016

(54) METHOD OF RECOGNIZING A POSITION OF A WORKPIECE FROM A PHOTOGRAPHED IMAGE

(71) Applicants: HONDA MOTOR CO., LTD., Tokyo (JP); CARNEGIE MELLON UNIVERSITY, Pittsburgh, PA (US)

(72) Inventors: Jose Jeronimo Moreira Rodrigues, Pittsburgh, PA (US); Jun-Sik Kim, Pittsburgh, PA (US); Makoto Furukawa, Tochigi (JP); Takeo Kanade, Pittsburgh, PA (US)

(73) Assignees: HONDA MOTOR CO., LTD., Tokyo (JP); CARNEGIE MELLON UNIVERSITY, Pittsburgh, PA (US)

( * ) Notice: Subject to any disclaimer, the term of this patent is extended or adjusted under 35 U.S.C. 154(b) by 383 days.

(21) Appl. No.: 13/710,763

(22) Filed: Dec. 11, 2012

(65) Prior Publication Data

US 2014/0161344 A1    Jun. 12, 2014

(51) Int. Cl.
*G06K 9/00*    (2006.01)
*G06T 7/00*    (2006.01)
*G06T 1/00*    (2006.01)

(52) U.S. Cl.
CPC ............. *G06T 7/0044* (2013.01); *G06T 1/0014* (2013.01); *G06T 7/004* (2013.01); *G06T 2207/30164* (2013.01)

(58) Field of Classification Search
USPC ......... 382/100, 103, 151–154, 173, 181, 190, 382/195, 209, 216, 224–228, 276, 282, 283, 382/288, 291; 700/192, 259; 348/94, 95; 702/150–154; 414/730

See application file for complete search history.

(56) References Cited

U.S. PATENT DOCUMENTS

| 4,305,130 | A | * | 12/1981 | Kelley et al. ................... 348/552 |
| 4,613,269 | A | * | 9/1986 | Wilder et al. ................... 348/92 |
| 4,835,450 | A | * | 5/1989 | Suzuki ......................... 382/153 |
| 6,721,444 | B1 | * | 4/2004 | Gu ........................ G06T 7/0044 382/218 |
| 7,177,459 | B1 | | 2/2007 | Watanabe et al. |
| 8,150,165 | B2 | | 4/2012 | Melikian |
| 8,755,562 | B2 | * | 6/2014 | Ishigami ............... G06T 7/0048 382/103 |
| 2004/0019405 | A1 | * | 1/2004 | Ban et al. ...................... 700/213 |
| 2006/0104788 | A1 | * | 5/2006 | Ban et al. ...................... 414/729 |
| 2008/0069435 | A1 | * | 3/2008 | Boca et al. .................... 382/153 |
| 2013/0006423 | A1 | * | 1/2013 | Ito et al. ....................... 700/259 |

* cited by examiner

*Primary Examiner* — Eric Rush
(74) *Attorney, Agent, or Firm* — Rankin, Hill & Clark LLP

(57) ABSTRACT

In a preparation process, one workpiece W is photographed from a plurality of angles, the photographed image is segmented into patches to obtain a plurality of sample patch images, the sample patch images are classified, and each sample patch image is stored while being corresponded with a position information to a reference position of the workpiece W. Image recognition process obtains a reference position of the workpiece W in a patch image, by photographing piled-up workpieces W, segment the photographed image into patches to obtain a plurality of patch images, classify the patch images in same classification method of the sample patch images, accumulating a position information to the reference position of the workpiece W, which is stored while corresponded to the sample patch image of the same classification as the patch image for each patch image, and on the basis of the accumulated result.

1 Claim, 5 Drawing Sheets

| | Label No. | Centroid | Pose | Confidence |
|---|---|---|---|---|
| | 000001 | (-12, 63) | (0.06, 0.12, 0.14, 0.30) | 1.0 |
| | 000002 | (1, 176) | (0.01, 0.32, 0.04, 0.03) | 1.0 |
| | 000003 | (153, -76) | (0.21, 0.07, 0.08, 0.01) | 0.5 |
| | | (160, -82) | (0.21, 0.07, 0.08, 0.01) | 0.5 |
| ⋮ | ⋮ | | | |

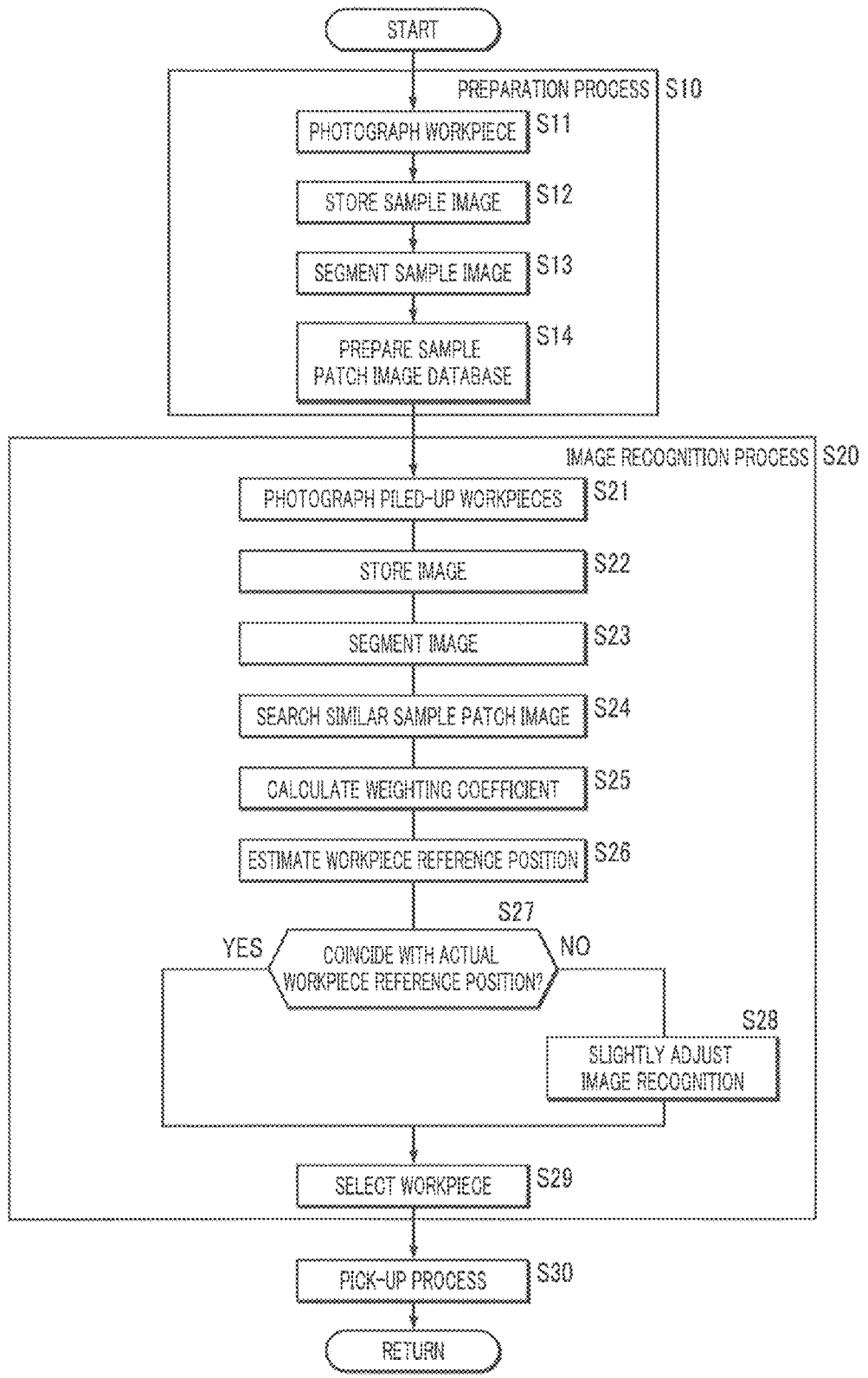

METHOD OF RECOGNIZING A POSITION OF A WORKPIECE FROM A PHOTOGRAPHED IMAGE

BACKGROUND OF THE INVENTION

1. Field of the Invention

The present invention relates to an image recognition method.

2. Description of the Related Art

In the case of picking up workpieces that are loosely piled with a robot and the like, it is necessary to accurately detect a position and a posture of the workpiece positioned in the uppermost region. In such case, conventionally, the workpiece to be picked is detected using a two-dimensional gray image from a CCD camera and performing pattern matching.

For example, U.S. Pat. No. 7,177,459 discloses a method of detecting a position and a posture of workpieces that are loosely piled using a pattern matching. In this method, first, an image of the loosely piled workpieces photographed by a two-dimensional CCD camera is matched with contour shapes of the workpiece preliminarily photographed from a plurality of directions, so as to obtain a relative posture of the workpiece and the CCD camera. Thereafter, on the basis of the obtained relative posture, the position and posture of the workpiece is measured by a three-dimensional visual sensor, which is moved to a position and posture capable of clearly grasping the characteristics of the target workpiece. By doing so, it becomes possible to accurately measure the position and posture of the workpiece.

Further, U.S. Pat. No. 8,150,165 discloses dividing a photographed image of a workpiece into icons (patches), and tagging a relative positional relationship between each icon.

However, in the photographed image in the state where a plurality of workpieces is complexly overlapped, the change of luminance in the image becomes random and the characteristics become ambiguous. Therefore, there are cases where the extraction of the contour shape is not possible by the pattern matching method, and so that the identification of the accurate position and posture of the workpiece is not possible.

SUMMARY OF THE INVENTION

The present invention is a method of recognizing a position of a workpiece from a photographed image, comprising: a preparation process, which comprises a process of photographing one workpiece from a plurality of angles, and obtaining a plurality of sample patch images by segmenting the photographed images into patches; a process of classifying a plurality of the sample patch images; and a process of storing the plurality of sample patch images, while corresponding each sample patch image with a position information to a reference position of the workpiece; a process of photographing a plurality of workpieces not aligned, and obtaining a plurality of patch images by segmenting the photographed image into patches; a process of classifying a plurality of the patch images, with a same method as the method in which a plurality of the sample patch images are classified; a process of accumulating a position information to the reference position of the workpiece, which is stored for each of a plurality of the patch image corresponded to the sample patch image of the same classification as the patch image; and a process of obtaining the reference position of at least one workpiece in the patch image, on the basis of the accumulation result of the position information.

According to the present invention, in the image photographing a non-aligned plurality of workpieces, the workpieces existing below are covered by other workpieces existing thereabove, so that they are partly or wholly not exposed. Therefore, in the case where the reference positions of the workpieces in the patch images segmenting the image are accumulated, the workpiece positioned in the uppermost region has large accumulation of the position information indicating the reference position thereof. Therefore, the workpiece having the reference position in the position represented by the position information having the largest accumulation may be conceived as the one most exposed.

As is explained above, the position information, which is corresponded to the sample patch images of a same classification as the patch images that are obtained by segmenting the image photographing a non-aligned plurality of workpieces, are accumulated. As such, even if there are some that cannot be classified or corresponded successfully, it becomes possible to ultimately obtain the position information of the workpiece which is highly reliable.

It is preferable to use a binary-tree method in the process of classifying a plurality of the sample patch images of the present invention.

In the process of classifying a plurality of the sample patch images of the present invention, it is preferable to perform classification by comparing luminance of each pixel, for each pixel constituting the sample patch image with a threshold value.

BRIEF DESCRIPTION OF THE DRAWINGS

FIG. 5 is a flowchart of an image recognition method.

DETAILED DESCRIPTION OF THE PREFERRED EMBODIMENTS

Figure 1:
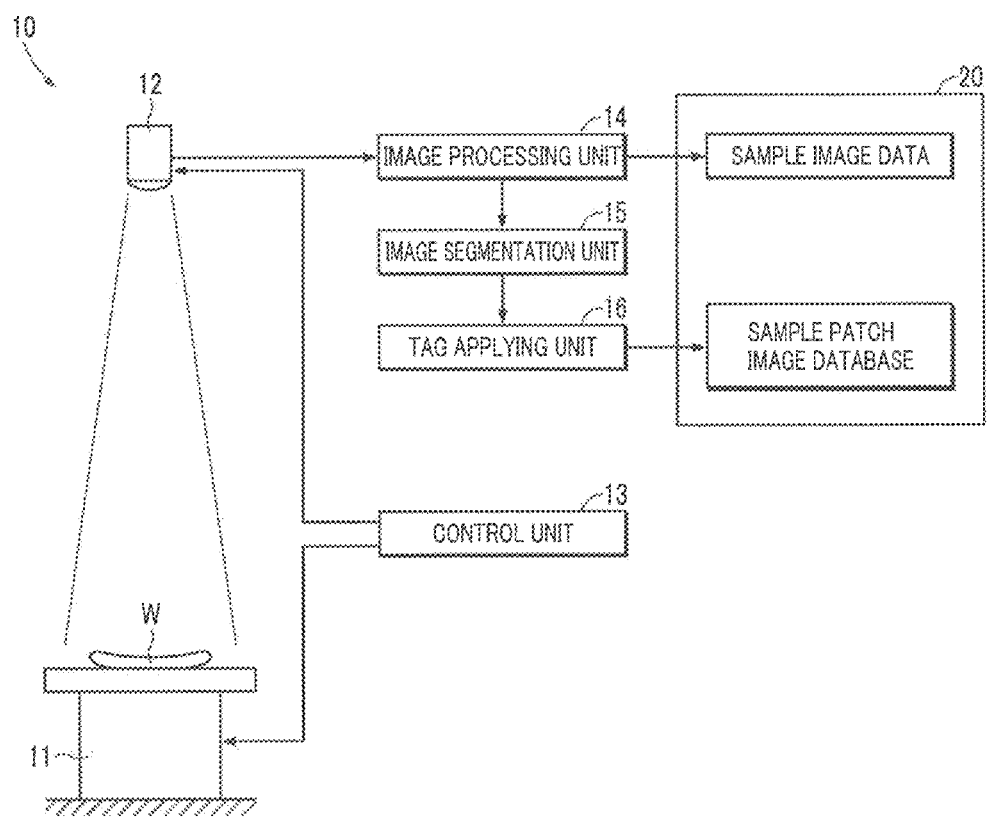
FIG. 1 is a diagram showing a configuration of a sample data acquiring device 10.

FIG. 1 is a drawing which shows a configuration of a sample data acquiring device 10 to be used in a preparation process according to an embodiment of the present invention.

The sample data acquiring device 10 is equipped with an installation platform 11 capable of installing a workpiece W at a given posture, an photographing device 12 which photographs one workpiece W installed on the installation platform 11 from above, and a control unit 13 which controls the posture of the installation platform 11 or the photographing device 12.

The installation platform 11 is, for example a rotary stage, and is configured so that the rotation thereof is capable of being controlled by the control unit 13. The photographing device 12 is a CCD camera herein, and generates data of a two-dimensional photographed image. The photographing device 12 is arranged above the installation platform 11, and by being supported by a supporting column or a ceiling, not shown.

The photographing device 12 is made to photograph the workpiece W in various postures, by controlling the posture of the installation platform 11 or the photographing device 12 by the control unit 13, by reversing the workpiece W installed on the installation platform 11 according to need.

The images photographed by the photographing device 12 from every direction encompassing the workpiece W spherically, are obtained as sample images. However, it is realistically impossible to obtain sample images photographing the workpiece W from every direction successively. Therefore, the sample images of representative postures of the workpiece W that are photographed by changing the photographing direction by certain small angles are obtained.

The sample data acquiring device 10 is further equipped with an image processing unit 14, an image segmentation unit 15, and a tag applying unit 16, and is connected to a storage device 20.

The image processing unit 14 performs a predetermined processing to each sample image photographed by the photographing device 12, and stores the same to the storage device 20 while coordinating each sample image with a posture information of the workpiece W at the time of photographing.

Figure 2:
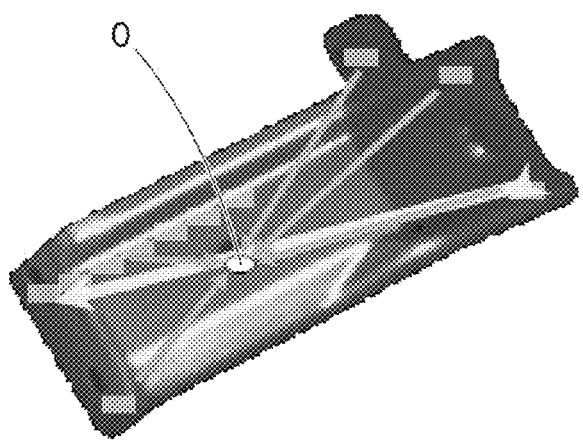
FIG. 2(*a*) is a diagram showing a state where a sample image is segmented into patches, and FIG. 2(*b*) shows an example of a part of a sample patch image database.

As is shown in FIG. 2(*a*), one reference position O, and one reference posture (reference direction) are preliminary set to the workpiece W. The reference position O may be set, for example to a center of gravity of the workpiece W, a center of a hole formed on the workpiece W, and the like. Further, for example, the posture information stored to the storage device 20 while coordinated with each sample image is a directional displacement information from the reference posture of the workpiece W at the time of photographing.

The image segmentation unit 15 performs a process of obtaining a plurality of sample patch images by segmenting each sample image to patches (small regions). The patch is, for example, a rectangle or a square region of a predetermined number of pixels×a predetermined number of pixels.

The tag applying unit 16 applies a positional relationship information and a reliability information related to the positional relationship information of the workpiece W as a tag to each sample patch image segmented by the image segmentation unit 15. Specifically, the positional relationship information is a relative coordinate information of the portion related to the sample patch image with respect to a reference position O of the workpiece W, and, a relative posture information of the portion with respect to the reference posture of the workpiece W.

Depending on the sample patch image, the relationship between the reference position O of the workpiece W may or may not be unambiguously obtained, so that the tag applying unit 16 applies a weighting coefficient as the reliability information.

For example, with reference to FIG. 2(*a*), in the sample patch image photographing a part of a side portion of the workpiece W, the image is not clear as to specifically what region of the side portion is photographed. In such case, the reliability is low, so that the weighting coefficient is lowered to that degree. More specifically, in the case where it is found that one sample patch image is an image of either one of a two portions of the workpiece W photographed from a particular direction, then the reliability is 50%, so that the weighting coefficient to be applied to this sample patch image becomes 0.5. On the other hand, for the sample patch image obtained by photographing a characteristic portion such as a corner of the workpiece W from a particular direction, the reference position O is set unambiguously, so that the reliability is high, and the weighting coefficient becomes 1.0.

Further, the tag applying unit 16 classifies the sample patch image by a binary-tree method of sorting by whether or not a luminance of each pixel constituting the sample patch image satisfies a condition equation of comparing sequentially with a predetermined threshold value. Thereafter, the tag applying unit 16 performs labeling by applying numbers according to the classification for each sample image.

Specifically, the tag applying unit 16 sorts the luminance of each pixel along a predetermined sequence taking, for example, an upper left pixel as a starting point, by applying "0" in the case where the luminance of each pixel is equal to or more than the threshold value, and "1" in the case where the same is less than the threshold value. By doing so, a numerical sequence, such as "100101 . . . " is set for each sample patch image. Thereafter, the sample patch images are rearranged in the order of the numerical sequence, and a number is applied to each sample patch image.

Further, the numerical sequence may be obtained by applying "0" in the case where the luminance of a specific pixel is equal to or more than the luminance of another specific pixel, and "1" in the case where the same is smaller, and sequentially selecting the pixel to be compared, and obtaining a numerical sequence such as "001101", and this numerical sequence may be added to the numerical sequence explained in the preceding paragraph. As is explained above, the question for obtaining the numerical sequence may be the one in which the answer is yes or no, and the answer is classified into binary of 0 and 1.

By sorting using the binary-tree method, the classification of the sample patch images of an enormous number may be lead to a repetition of simple binary classification. Therefore, it becomes possible to classify the sample patch images in short period of time using a computer. However, it is not limited to classification using the binary-tree method, and it may be classified by a well-known arbitrary image classification method, such as extracting characteristic parameters from the sample patch images.

Thereafter, the tag applying unit 16 stores each sample patch image as a sample patch image database in the storage device 20, in the order of applied number, while corresponding the same with the positional relationship information, the reliability information, and the numerical sequence, as is shown in FIG. 2(*b*).

Figure 3:
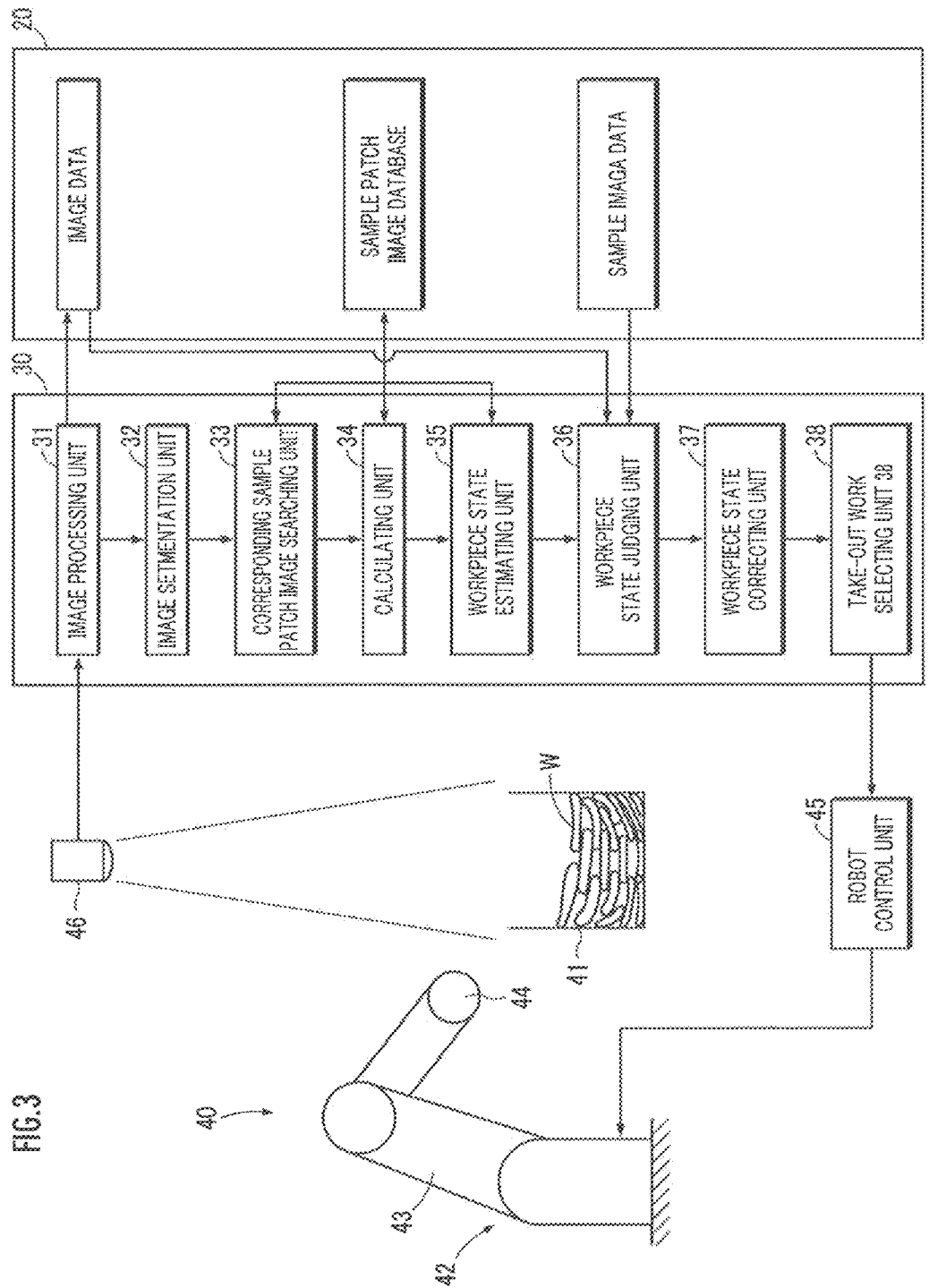
FIG. 3 is a diagram showing a configuration of a picking-up system 40 equipped with a workpiece position posture recognizing device 30.

FIG. 3 is a view showing a configuration of a picking-up system 40 equipped with a workpiece position posture recognizing device 30, which is used in an image recognition method in the embodiment of the present invention.

The workpiece position posture recognizing device 30 is a device for obtaining the position and posture of the workpieces W piled up inside a hopper (storage tank) 41. The workpieces W have an identical shape, and are untidily piled up in large quantity at a three-dimensionally arbitral position and posture inside the hopper 41. The workpiece position posture recognizing device 30 obtains the reference position O and the posture of the workpiece W, among the piled up workpieces W, the one positioned at the uppermost section, and which is suitable to be picked-up.

The picking-up system 40 is equipped with a robot 42 which picks up the workpiece W one by one, according to the reference position information and the posture information of the workpiece W supplied from the workpiece position posture recognizing device 30. The robot 42 is equipped with an arm 43, a hand 44 which is an end effector of the arm 43, and a robot control unit 45 which controls the operations of the arm 43 and the hand 44.

The robot control unit 45 converts the reference position information and the posture information of the workpiece W to be picked up, which is supplied from the workpiece position posture recognizing device 30 into a robot coordinate system, and controls the arm 43 and the hand 44 so as to pick up the workpiece W with the hand 44.

The picking-up system 40 is further equipped with a photographing device 46 which photographs the workpieces W piled up inside the hopper 41 from above. The photographing device 46 is in this case a CCD camera, and generates two-dimensional photographed images. The photographing device 46 is arranged above the hopper 41, by being supported by a supporting column or a ceiling, not shown, and the photographed image takes the plurality of workpieces W piled up.

The workpiece position posture recognizing device 30 is equipped with an image processing unit 31, an image segmentation unit 32, a corresponding sample patch image searching unit 33, a tallying unit 34, a workpiece state estimating unit 35, a workpiece state judging unit 36, a workpiece state correcting unit 37, and a take-out work selecting unit 38, and is connected to the storage device 20.

The image processing unit 31 takes in the image photographed by the photographing device 46, and stores the image data after performing predetermined processing to the storage device 20.

The image segmentation unit 32 performs a process of obtaining a plurality of patch images, by segmenting the image processed by the image processing unit 31 into a plurality of patches (small regions). This patch is a region consisting of the same number of pixels×the same number of pixels as in the patch in which the sample image is segmented by the image segmentation unit 15. A scale size of the patch segmented by the image segmentation unit 32 is adjusted so as to become approximately the same as a scale size of the patch segmented by the image segmentation unit 15.

Although not shown, it is preferable that the picking-up system 40 is equipped with a distance measurement device configured to measure a distance from a surface of the uppermost section of the workpiece W group to the photographing device 46. A distance measuring method of the distance measurement device is not limited, and the distance may be measured, for example, by an active stereo method. By being equipped with the distance measurement device, it becomes easy to adjust the scale size of the patch segmented by the image segmentation unit 32 to be approximately the same as the scale size of the patch segmented by the image segmentation unit 15.

The corresponding sample patch image searching unit 33 searches, from the sample patch image database stored in the storage device 20, to which sample patch image segmented by the image segmentation unit 15 each patch image segmented by the image segmentation unit 32 is most similar to.

The corresponding sample patch image searching unit 33 obtains the numerical sequence corresponded to each patch image segmented by the image segmentation unit 32, in the same method as in the numerical sequence obtained by the tag applying unit 16. The corresponding sample patch image searching unit 33 searches for the sample patch image with the numerical sequence coinciding with the numerical sequence corresponded to each patch image.

The corresponding sample patch image searching unit 33 obtains the numerical sequence in the same binary-tree method, similarly to the tag applying unit 16, and compares the obtained numerical sequence with the numerical sequence applied by the tag applying unit 16, so that it becomes possible to search the coinciding sample patch image in a short period of time.

Thereafter, the corresponding sample patch image searching unit 33 determines the sample patch image with the numerical sequence completely coinciding with the numerical sequence corresponded to each patch image, or the sample patch image with the numerical sequence of a threshold number or more out of the numerical sequence coinciding with each patch image, as the most similar sample patch image. There are cases where two workpieces W are overlapped, and a branch exists in the patch image. In such case, the sample patch image with the coinciding or similar numerical sequence does not exist.

Figure 4:
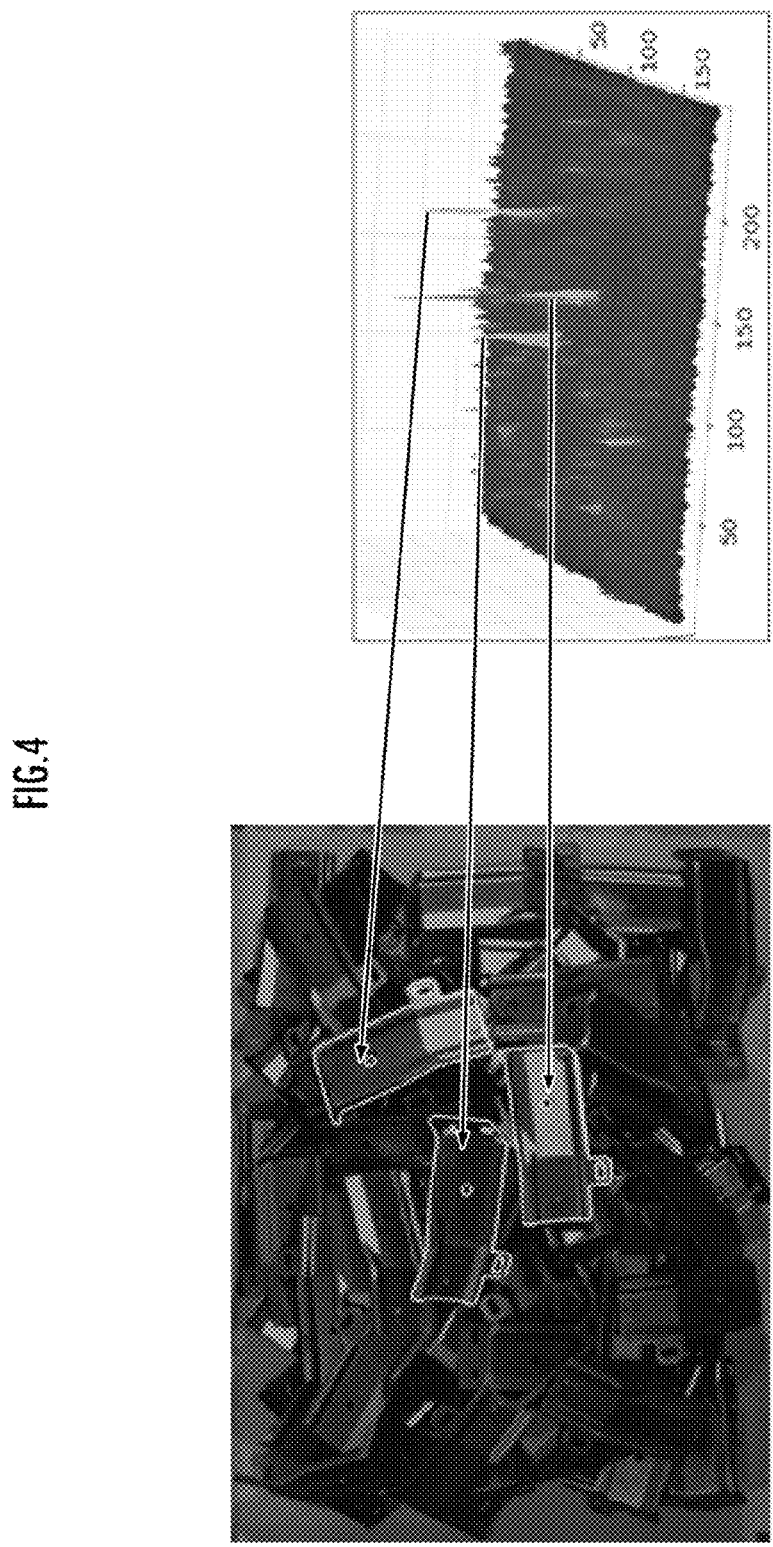
FIG. 4 is a diagram showing a tallied result of scores, and a position estimate of a workpiece on the basis of the tallied result.

The tallying unit 34 obtains a score of tallying the total sum of weighting coefficient, for each reference position information labeled to the sample patch image searched by the corresponding sample patch image searching unit 33, as is shown in FIG. 4. Specifically, the tallying unit 34 calculates a sum value of the weighting coefficient, for each reference position information stored corresponded to the sample patch image searched by the corresponding sample patch image searching unit 33, respectively corresponded to all patch image obtained by segmenting the image photographed by the photographing device 46.

As is shown in FIG. 4, the workpiece state estimating unit 35 estimates the reference position O and the posture of the workpiece W, on the basis of the result of calculation by the tallying unit 34.

The workpiece state judging unit 36 judges whether or not the reference position O and the posture of the workpiece W estimated by the workpiece state estimating unit 35 coincides with the actual reference position O and the reference posture of the workpiece W.

The workpiece state judging unit 36 estimates that the reference position O of the workpiece W exists at a position (coordinate) with a large score, within the image photographed by the photographing device 46. The workpiece W existing relatively lower in the hopper 41 is covered in part or in whole by the upper workpieces W, so that it cannot obtain high score from the image photographing such state. Therefore, it is possible to estimate that the workpiece W positioned in the uppermost section has higher score. Therefore, it can be evaluated that the workpiece W having the reference position O at the coordinate which obtained the highest score, is the workpiece W most exposed.

The tallying unit 34 may obtain the score of tallying the total sum of the weighting coefficient of each posture labeled to the sample patch image searched by the corresponding sample patch image searching unit 33. By doing so, the workpiece state judging unit 36 is capable of estimating that there is the workpiece W exposed in the state of the posture with high score.

The posture of the workpieces W actually piled up are arbitrary, so that there are postures in the state not coinciding with the posture of the photographed sample image. That is, the posture of the estimated workpiece W is a most similar posture selected from a discrete database, so that there are cases where it is slightly different from the actual posture of the workpiece W. Therefore, it is necessary to judge whether or not the reference position O and the posture of the workpiece W estimated by the workpiece state estimating unit 35 coincides with the actual reference position O and the posture of the workpiece W in a precision to the extent not influencing the pickup by the robot.

Therefore, the workpiece state judging unit 36 judges by a shape pattern matching a degree of coincidence between an edge of the photographed image of the actual workpiece W, and an overall outline of the workpiece W obtained from the sample image.

Specifically, the workpiece state judging unit 36 extracts the edge by a well-known method, such as performing a differential processing to the photographed image of the actual workpiece W. Further, the workpiece state judging unit 36 obtains the overall outline of the workpiece W existing in the reference position O estimated by the workpiece state estimating unit 35, by a well-known method such as performing a differential processing to the sample image.

Subsequently, the workpiece state judging unit 36 matches the reference position O estimated by the workpiece state estimating unit 35 to the reference position O in the photographed image of the actual workpiece W, and thereafter superimposes the outline obtained earlier. Thereafter, the workpiece state judging unit 36 compares the outline and the actual edge with the most adjacent pixels, and judges whether or not the outline and the actual edge coincides as a whole, by a correlation value of the compared pixels on the basis of a predetermined threshold value.

In the case where it is judged by the workpiece state judging unit 36 that it does not coincide with the actual state of the workpiece W, the workpiece state correcting unit 37 slightly changes the reference position O or the posture of the workpiece W estimated by the workpiece state estimating unit 35 so that it coincides better. Thereafter, the workpiece state judging unit 36 decides whether or not the slightly changed reference position O and the posture of the workpiece W coincides with the reference position O and the posture of the actual workpiece W.

The take-out work selecting unit 38 selects the workpiece W with the reference position O and the posture of the actual workpiece W obtained by the workpiece state judging unit 36 suitable to be taken out by the robot 42. Thereafter, the take-out work selecting unit 38 transmits the reference position O and the posture of the selected workpiece W to the robot control unit 45. The selection method of the workpiece W to be taken out is not limited. For example, the workpiece W which may be grasped with simple control of the robot 42, or the workpiece W with high reliability of estimation by the workpiece state estimating unit 35.

Hereinafter, with reference to FIG. 5, an image recognition method of the embodiment of the present invention will be explained.

First, the preparation process is performed using the sample data acquiring device 10 explained above (S10).

In the preparation process, first, one workpiece W identical to the workpiece W is installed on the installation platform 11. Thereafter, while rotating and the like the installation platform 11 with the control unit 13, the photographing device 12 photographs the workpiece W from various angles (S11).

Thereafter, the image processing unit 14 corresponds the photographed sample images with the posture information of the photographed workpiece W, and stores the same in the storage device 20 (S12).

Subsequently, the image segmentation unit 15 segments each sample image to patches, and obtains a plurality of sample patch images (S13).

Subsequently, the tag applying unit 16 applies the positional relationship information, and the reliability information related to the positional relationship information of the workpiece W as the tag to each sample patch image segmented in S13, and obtains the numerical sequence from the condition equation explained above, applies numbers, and performs labeling. Further, the tag applying unit 16 corresponds the positional relationship information, the reliability information, and the numerical sequence in the order of the number applied, and stores each sample patch image as the sample patch image database to the storage device 20 (S14).

Then, after completion of the preparation process, the image recognition process (S20) of the workpiece W is performed, using the above-mentioned picking-up system 40.

In the image recognition process, first, the photographing device 46 photographs the hopper 41 in which the workpieces W are piled up randomly (S21).

Thereafter, the image processing unit 31 stores the image data photographed by the photographing device 46 to the storage device 20 (S22).

Subsequently, the image segmentation unit 32 segments the image processed in S22 into a plurality of patches, and obtains a plurality of patch images (S23).

Subsequently, the corresponding sample patch image searching unit 33 searches, from the sample patch image database stored in the storage device 20, to which sample patch image segmented in S13 each patch image segmented in S23 is most similar to (S24).

Subsequently, the tallying unit 34 obtains the score of tallying the total sum of the weighting coefficient, for each reference position information labeled to the sample patch image searched by the corresponding sample patch image searching unit 33 (S25).

Subsequently, the workpiece state estimating unit 35 estimates the reference position O and the posture of the workpiece W, on the basis of the result of tallying in S25 (S26).

Subsequently, the workpiece state judging unit 36 judges whether or not the reference position O and the posture of the workpiece W estimated in S26 coincides with the reference position O and the posture of the actual workpiece W (S27).

Then, in the case where it is determined as not coinciding in S27 (S27: NO), then the workpiece state correcting unit 37 slightly changes the reference position O or the posture of the workpiece W estimated in S27, and performs a fine adjustment of the image recognition result (S28). Thereafter, the workpiece state judging unit 36 judges whether or not the slightly-changed reference position and posture of the workpiece W coincides with the reference position and posture of the actual workpiece W (S27).

In the case where it is determined as coinciding in S27 (S27:YES), then the take-out work selecting unit 38 selects the workpiece W suitable to be taken out by the robot 42, from the actual reference position and posture of the workpiece W obtained in S27 (S29).

Thereafter, finally, using the robot 42 explained above, a pick-up process (S30) of picking up the workpiece W selected in S28 is performed.

The embodiment of the present invention is explained above. However, the present invention is not limited to the above-explained embodiment, and is capable of being applied while arbitrarily modifying the same in the range not departing from the essence of the present invention.

What is claimed is:

1. A method of recognizing a position of a workpiece from a photographed image, comprising:
    a preparation process, which comprises
        a process of photographing one workpiece from a plurality of angles to create photographed images, and obtaining a plurality of sample patch images by segmenting the photographed images into patches;
        a process of classifying the plurality of sample patch images;
        a process of storing the plurality of sample patch images, while corresponding each sample patch image with position information relative to a reference position of the workpiece, and reliability information related to a reliability of the position information; and
        a process of applying a weighting coefficient to each of the plurality of sample patch images based on the reliability information of each of the plurality of sample patch images;

a process of photographing a plurality of workpieces not aligned to create a photographed image, and obtaining a plurality of patch images by segmenting the photographed image into patches;

a process of classifying all of the plurality of patch images, with a same method as the method in which the plurality of sample patch images are classified;

a process of obtaining a singular score by tallying a total sum of weighting coefficients, for position information relative to the reference position of the workpiece, which is stored for each of the plurality of patch images corresponded to a sample patch image of a same classification as the patch image; and a process of obtaining the reference position of at least one workpiece in the photographed image, on the basis of the singular score.

* * * * *